United States Patent
Nones et al.

(10) Patent No.: US 8,580,866 B2
(45) Date of Patent: Nov. 12, 2013

(54) DRY POWDER POLYMER FINISH

(75) Inventors: Carlos Nones, Riverside, CA (US); Pedro Paredes, Moreno Valley, CA (US)

(73) Assignee: Parex USA, Inc., Anaheim, CA (US)

( * ) Notice: Subject to any disclaimer, the term of this patent is extended or adjusted under 35 U.S.C. 154(b) by 0 days.

(21) Appl. No.: 12/964,198

(22) Filed: Dec. 9, 2010

(65) Prior Publication Data

US 2012/0101186 A1  Apr. 26, 2012

Related U.S. Application Data

(60) Provisional application No. 61/394,912, filed on Oct. 20, 2010.

(51) Int. Cl.
| | |
|---|---|
| *C08K 3/20* | (2006.01) |
| *C08K 3/26* | (2006.01) |
| *C08K 3/34* | (2006.01) |
| *C09D 133/08* | (2006.01) |

(52) U.S. Cl.
USPC ............ 523/122; 524/35; 524/425; 524/445; 524/449

(58) Field of Classification Search
USPC ............. 523/122; 524/35, 425, 445, 449
See application file for complete search history.

(56) References Cited

U.S. PATENT DOCUMENTS

| | | | |
|---|---|---|---|
| 2002/0161103 A1* | 10/2002 | Harris et al. | 524/502 |
| 2010/0081736 A1* | 4/2010 | Willimann et al. | 524/42 |
| 2010/0294667 A1* | 11/2010 | Polk | 205/50 |

* cited by examiner

*Primary Examiner* — Kriellion Sanders
(74) *Attorney, Agent, or Firm* — Berliner & Associates

(57) ABSTRACT

A dry powder composition for preparing a dry form of an acrylic finish is provided. The dry powder composition includes: calcium carbonate filler, coalescing aid, pH adjuster, and an acrylic-based re-dispersible polymer in powder form. In various embodiments, aggregate, silica sand, titanium dioxide, cellulose thickener, biocide, clay, cellulose fiber, mica filler, and/or defoamer are added. The dry powder composition can further comprise a hydrophobic agent. The dry powder can be mixed with a volume of water to produce a wet coating for application to a substrate.

11 Claims, No Drawings

DRY POWDER POLYMER FINISH

CROSS-REFERENCE TO RELATED APPLICATIONS

This application claims the benefit of Provisional Patent Application No. 61/394,912, filed on Oct. 20, 2010, which is incorporated by reference herein.

BACKGROUND

1. Field of the Invention

The invention relates to a composition and method for preparing polymer-based finishes.

2. Related Art

Textured coating products available in the market are either wet acrylic finishes, cement-based stucco finishes or polymer-modified cement based stucco finishes. Although cement-based and polymer-modified cement based stucco finishes are provided in powder form, acrylic finishes have been provided only in wet form.

SUMMARY

In one aspect, a dry powder composition for preparing a dry form of an acrylic finish is provided. The dry powder composition includes: calcium carbonate filler, coalescing aid, pH adjuster, and an acrylic-based re-dispersible polymer in powder form. Embodiments of the composition can further include aggregate, sand, or titanium dioxide, or any combination thereof. In any embodiment, the composition can further include cellulose thickener, clay, cellulose fiber, mica filler, or deformer, or any combination thereof. Also, any embodiment of the composition can include a biocide. The aggregate, sand, and titanium dioxide can provide different aesthetics and textures to the acrylic finish. The cellulose thickener, clay, cellulose fiber, mica filler, and deformer can provide a better working wet coating. The biocide can improve the longevity of the applied acrylic finish.

In particular embodiments, the dry powder composition includes: aggregate, calcium carbonate filler, titanium dioxide, cellulose thickener, biocide, coalescing aid, clay, cellulose fiber, pH adjuster, mica filler, defoamer, and an acrylic-based re-dispersible polymer in powder form. In certain embodiments, the aggregate is crushed limestone. The dry powder composition can further comprise sand (which can be, for example, 99% or more silicon dioxide) and/or a hydrophobic agent. In addition, a wet composition can be prepared by mixing the dry powder composition with water. In some embodiments, the dry powder composition is made of acrylic polymer or co-polymer and crushed marble aggregates.

When the dry powder composition is mixed with an appropriate amount of water, the resulting mixture can be applied as a thick aggregate, can be spread using a steel trowel for textures, can be sprayed using a spray gun, can be floated using a plastic or steel trowel to achieve a desirable texture, or can be applied in other ways known in the construction industry. The mixture can be applied vertically, and can be used on a properly prepared substrate such as gypsum board, cement board, plaster, and the like, and on masonry, concrete, stucco substrate, and EIFS substrate, and the like, both for exterior and interior applications.

Embodiments of the composition can produce a coating (with a non-tacky surface in some embodiments) that provides high resistance to the accumulation of mold, dirt and other pollutants. The coating can be a non-volatile organic compound (VOC) powder textured coating. In particular embodiments, the dry powder composition and its packaging can be considered environmentally friendly by containing zero or low volatile organic components.

In various embodiments, the dry powder composition can be formulated to produce different textures, such as smooth, fine, coarse or swirl textures.

DETAILED DESCRIPTION

Particular embodiments of the dry powder composition can contain the following components. For example, the aggregate can be crushed limestone or silica sand. In certain embodiments, the aggregate can be crushed limestone having a nominal size of 1.0 mm and crushed limestone having a nominal size of 0.5 mm. Alternatively, the aggregate can be a light weight aggregate such as pumice, perlite, hyperlite or vermiculite. The calcium carbonate filler can be, for example, 97% calcium carbonate, 200 mesh. The cellulose thickener can be a cellulose ether or a methylcellulose. The biocide can be a fungicide, mildewcide, algaecide, antimicrobial, or any combination thereof. For example, the biocide can be a benzimidazole such as carbendazim. The coalescing aid can be an aliphatic alcohol on an inorganic carrier. The clay can be attapulgite clay, bentonite or hectorite. The pH adjuster can be hydrated lime, sodium hydroxide or potassium hydroxide. The mica filler can be ground muscovite mica. The defoamer can be a powder defoamer based on a liquid hydrocarbon and/or polyglycol on an inorganic carrier. The re-dispersible polymer is an acrylic polymer or copolymer. Examples of such polymers include, but are not limited to, styrene acrylic copolymers, vinyl acrylic copolymers, and vinyl acetate-acrylate copolymers. The particular amounts, mesh sizes, and particle sizes of the various components of the dry powder composition can be adjusted depending on the desired texture, weight and other properties of the finish coating.

In some embodiments, a hydrophobic agent can be added to the dry powder composition to provide self-cleaning properties. For example, a polysiloxane polymer can be added to the dry powder composition in an amount of 2.5%.

The present invention may be better understood by referring to the accompanying examples, which are intended for illustration purposes only and should not in any sense be construed as limiting the scope of the invention.

Example 1

A composition of calcium carbonate filler, coalescing aid, pH adjuster, and an acrylic-based re-dispersible polymer in powder form is prepared by mixing the components in the following amounts:

| | |
|---|---|
| calcium carbonate filler | 75 wt % |
| redispersible powder polymer | 20 wt % |
| coalescing aid | 4 wt % |
| pH adjuster | 1 wt % | or the following ranges:

| | |
|---|---|
| calcium carbonate filler | 60-80 wt % |
| redispersible powder polymer | 10-30 wt % |
| coalescing aid | 3-5 wt % |
| pH adjuster | 0.5-1.5 wt % |
| | 100 wt % |

When aggregate is added, the components can be mixed in the following amounts and ranges:

| Raw Materials | % Weight | Range, % Weight |
|---|---|---|
| crushed limestone | 50 | 40-60 |
| calcium carbonate filler | 32 | 27-37 |
| redispersible powder polymer | 15 | 10-20 |
| coalescing aid | 2 | 1.5-3.5 |
| pH adjuster | 1 | 0.5-1.5 |
| | | 100 wt % |

Sand can be added to obtain a desired texture, for example, in the range of 10-60 wt %, with the amount of crushed limestone being proportionately reduced.

When added, the particular amounts of other components such as titanium dioxide, cellulose thickener, clay, cellulose fiber, mica filler, deformer, and/or biocide are adjusted based on the desired properties of the finish coating. Typically, these other components can be added in the following amounts and ranges:

| Raw Materials | % Weight | Range, % Weight |
|---|---|---|
| crushed limestone | 50 | 40-60 |
| calcium carbonate filler | 28.25 | 25-35 |
| redispersible powder polymer | 11 | 9-13 |
| coalescing aid | 3 | 2-4 |
| pH adjuster | 0.5 | 0.25-1.0 |
| titanium dioxide | 3.5 | 2-4 |
| cellulose ether thickener | 0.2 | 0.05-0.3 |
| clay | 1.5 | 0.5-2.5 |
| cellulose fiber | 0 2 | 0.05-0.3 |
| mica | 1.5 | 0.5-2.5 |
| powder defoamer | 0.3 | 0.1-0.5 |
| biocide | 0.05 | 0.01-0.1 |
| | | 100 wt % |

Example 2

Table 1 describes the components, particular component amounts for a particular embodiment of the dry powder composition, and component ranges for embodiments of the dry powder composition for producing a coarser grain finish. In Table 1, the listed amounts and ranges are in wt %.

TABLE 1

| Component | Trade Name | Manufacturer Information | Particular Component Amount, (approximate wt %) | Component Range A (approximate wt %) | Component Range B (approximate wt %) |
|---|---|---|---|---|---|
| Crushed Limestone | Tecno 1620 (1.0 mm) | Tecno Industries Saltillo KM7 Industrial el Obispo Santa Catarina Monterrey Mexico | 32.5 | 30.9-34.1 | 31.7-33.3 |
| Crushed Limestone | Tecno 3050 (0.5 mm) | Tecno Industries Same as above | 18.76 | 17.8-19.7 | 18.29-19.22 |
| Calcium Carbonate | Titan 200 (200 mesh) | Omya Inc 7299 Crystal creek Rd, Lucerne Valley, CA 92356 | 28 | 26.6-29.4 | 27.3-28.7 |
| Titanium Dioxide | Kronos 2310 | Kronos Inc PO Box 4272 Houston, TX 77210 | 3.55 | 3.37-3.73 | 3.46-3.64 |
| Cellulose Ether Thickener | Combizel 1 HK4M | Ashland Aqualon 4704 W briar Rock Drive Eagle, ID 83616 | 0.11 | 0.10-0.12 | 0.107-0.113 |
| Biocides | Troysan CF20 | Troy Corporation 8 Vreeland Rd Florham Park, NJ 07932 | 0.05 | 0.0475-0.0525 | 0.0487-0.0512 |
| Coalescing Aid | Metolat P872 | Munzing 1455 Broad Street Bloomfield, NJ 07003 | 2.6 | 2.47-2.73 | 2.535-2.665 |
| Attapulgite Clay | Attagel 20 | BASF Corp 101 Wood Avenue Iselin NJ 08830 | 1.10 | 1.045-1.155 | 1.072-1.127 |
| Dry Acrylic Polymer | Elotex WR 8600 | Akzo Nobel 10 Findeme Ave Bridgewater, NJ 08807 | 11.0 | 10.45-11.55 | 10.725-11.275 |
| Cellulose Fibers | Pre-co-Floc PB33 | Ep Minerals 9785 Gateway Drive Reno NV 89521 | 0.13 | 0.1235-0.1365 | 0.1267-0.1332 |
| Hydrated Lime (pH adjuster) | Lime Type S | Chemical Lime 8000 W Lake Mead Dr, BMI Complex Henderson, NV 89015 | 0.4 | 0.38-0.42 | 0.39-0.41 |

TABLE 1-continued

| Component | Trade Name | Manufacturer Information | Particular Component Amount, (approximate wt %) | Component Range A (approximate wt %) | Component Range B (approximate wt %) |
|---|---|---|---|---|---|
| Muscovite Mica (filler) | Mica 4K | Imerys 100 Mansell Court East Roswell, GA 30076 | 1.5 | 1.425-1.575 | 1.462-1.537 |
| Powder Defoamer | Agitan P823 | Munzing Same as Munzing above | 0.3 | 0.285-0.315 | 0.292-0.307 |

Example 3

Table 2 describes the components, particular component amounts for a particular embodiment of the dry powder composition, and component ranges for embodiments of the dry powder composition for producing a finer grain finish. In Table 2, the listed amounts and ranges are in wt %.

TABLE 2

| Component | Trade Name | Manufacturer Information | Particular Component Amount, (approximate wt %) | Component Range A (approximate wt %) | Component Range B (approximate wt %) |
|---|---|---|---|---|---|
| Crushed Limestone | Tecno 1640 | Tecno Industries Saltillo KM7 Industrial el Obispo Santa Catarina Monterrey Mexico | 39.0 | 37.05-40.95 | 38.02-39.97 |
| Silica Sand | Sand 70 | Simplot PO Box 308 Overton, NV 89040 | 10 | 9.5-10.5 | 9.75-10.25 |
| Calcium Carbonate | Omya10 | Omya Inc 7299 Crystal creek Rd, Lucerne Valley, CA 92356 | 12.5 | 11.875-13.125 | 12.187-12.812 |
| Calcium Carbonate | Titan 200 | Omya Inc 7299 Crystal creek Rd, Lucerne Valley, CA 92356 | 17.83 | 16.94-18.72 | 17.38-18.28 |
| Titanium Dioxide | Kronos 2310 | Kronos Inc PO Box 4272 Houston, TX 77210 | 3.62 | 3.44-3.80 | 3.53-3.71 |
| Cellulose Ether Thickener | Combizell HK4M | Ashland Aqualon 4704 W briar Rock Drive Eagle, ID 83616 | 0.09 | 0.10-0.12 | 0.107-0.113 |
| Biocides | Troysan CF20 | Troy Corporation 8 Vreeland Rd Florham Park, NJ 07932 | 0.05 | 0.0475-0.0525 | 0.0487-0.0512 |
| Coalescing Aid | Metolat P872 | Munzing 1455 Broad Street Bloomfield, NJ 07003 | 2.6 | 2.47-2.73 | 2.535-2.665 |
| Attapulgite Clay | Attagel 20 | BASF Corp 101 Wood Avenue Iselin NJ 08830 | 1.10 | 1.045-1.155 | 1.072-1.127 |

TABLE 2-continued

| Component | Trade Name | Manufacturer Information | Particular Component Amount, (approximate wt %) | Component Range A (approximate wt %) | Component Range B (approximate wt %) |
|---|---|---|---|---|---|
| Dry Acrylic Polymer | Elotex WR 8600 | Akzo Nobel 10 Findeme Ave Bridgewater, NJ 08807 | 11.0 | 10.45-11.55 | 10.725-11.275 |
| Cellulose Fibers | Pre-co-Floc PB33 | Ep Minerals 9785 Gateway Drive Reno NV 89521 | 0.13 | 0.1235-0.1365 | 0.1267-0.1332 |
| Hydrated Lime (pH adjuster) | Lime Type S | Chemical Lime 8000 W Lake Mead Dr, BMI Complex Henderson, NV 89015 | 0.4 | 0.38-0.42 | 0.39-0.41 |
| Muscovite Mica (filler) | Mica 4K | Imerys 100 Mansell Court East Roswell, GA 30076 | 1.5 | 1.425-1.575 | 1.462-1.537 |
| Powder Defoamer | Agitan P823 | Munzing Same as Munzing above | 0.3 | 0.285-0.315 | 0.292-0.307 |

Example 4

One way to prepare the dry powder composition is to weigh out all ingredients, for example according to Table 1 or 2. The crushed limestone is dumped into a vertical paddle blender fitted with choppers and the blender is started. Then calcium carbonate plus the titanium dioxide, cellulose ether, biocide, coalescing aid, attapulgite clay, cellulose fiber, and powder defoamer are added to the blender. The dry acrylic polymer is then added together with the hydrated lime and muscovite mica. The ingredients are blended for about 5 minutes. Samples are taken for quality control.

Example 5

To use the dry powder to prepare a wet coating, the dry powder composition is mixed with a volume of water. For example, 40 lb of the dry powder composition is mixed with 1.25 gallons of water. Depending on the desired consistency of the wet coating, the wet coating can be applied to a substrate by, for example, spraying or troweling according to standard industry practices.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the invention and the following claims.

What is claimed is:

1. A dry powder composition for an acrylic finish, comprising:
    calcium carbonate filler, aliphatic alcohol coalescing aid, pH adjuster, and an acrylic-based re-dispersible polymer in powder form,
    wherein the pH adjuster is hydrated lime, sodium hydroxide or potassium hydroxide, and the composition is in dry form.

2. The composition of claim 1, further comprising: aggregate, sand, or titanium dioxide, or any combination thereof.

3. The composition of claim 1, further comprising: cellulose thickener, clay, cellulose fiber, mica filler, or deformer, or any combination thereof.

4. The composition of claim 1, further comprising a biocide.

5. A dry powder composition for an acrylic finish, comprising:
    aggregate, calcium carbonate filler, titanium dioxide, cellulose thickener, biocide, aliphatic alcohol coalescing aid, clay, cellulose fiber, pH adjuster, mica filler, defoamer, and an acrylic-based re-dispersible polymer in powder form,
    wherein the pH adjuster is hydrated lime, sodium hydroxide or potassium hydroxide, and the composition is in dry form.

6. The composition of claim 5, wherein the aggregate is crushed limestone.

7. The composition of claim 5, further comprising sand.

8. The composition of 5, further comprising a polysiloxane polymer hydrophobic agent.

9. The composition of claim 1, wherein the re-dispersible polymer is 10 wt % to 30 wt % of the dry powder composition.

10. The composition of claim 1, wherein the re-dispersible polymer is 9 wt % to 13 wt % of the dry powder composition.

11. The composition of claim 5, wherein the re-dispersible polymer is 9 wt % to 13 wt % of the dry powder composition.

* * * * *